(12) United States Patent
Hewitt et al.

(10) Patent No.: US 10,648,349 B2
(45) Date of Patent: May 12, 2020

(54) METHOD OF MANUFACTURING A COATED TURBINE BLADE AND A COATED TURBINE VANE

(71) Applicant: ROLLS-ROYCE plc, London (GB)

(72) Inventors: Andrew Hewitt, Derby (GB); Ian W R Harrogate, Derby (GB)

(73) Assignee: ROLLS-ROYCE PLC, London (GB)

(*) Notice: Subject to any disclaimer, the term of this patent is extended or adjusted under 35 U.S.C. 154(b) by 247 days.

(21) Appl. No.: 15/915,200

(22) Filed: Mar. 8, 2018

(65) Prior Publication Data

US 2018/0258776 A1   Sep. 13, 2018

(30) Foreign Application Priority Data

Mar. 13, 2017   (GB) .................................. 1703945.4

(51) Int. Cl.
    *F01D 5/28*     (2006.01)
    *F01D 9/04*     (2006.01)
    (Continued)

(52) U.S. Cl.
    CPC ................ *F01D 5/288* (2013.01); *B22F 5/04* (2013.01); *C23C 4/02* (2013.01); *C23C 4/11* (2016.01); *C23C 28/321* (2013.01); *C23C 28/3215* (2013.01); *C23C 28/3455* (2013.01); *B22F 3/1055* (2013.01); *B33Y 80/00* (2014.12); *F01D 9/041* (2013.01); *F05D 2230/312* (2013.01); *F05D 2230/313* (2013.01); *F05D 2230/90* (2013.01); *F05D 2240/12* (2013.01);
    (Continued)

(58) Field of Classification Search
    CPC ............................. F01D 5/288; F05D 2230/90
    See application file for complete search history.

(56) References Cited

U.S. PATENT DOCUMENTS 5,244,345 A * 9/1993 Curtis ........................ F01D 5/22
                                                        416/95
5,419,971 A * 5/1995 Skelly ........................ C23C 4/02
                                                        428/612
(Continued)

FOREIGN PATENT DOCUMENTS

EP   1239058   9/2002
EP   2853687   4/2015

OTHER PUBLICATIONS

Great Britain Search Report dated Aug. 7, 2017 issued in GB Patent Application No. 1703945.4.

*Primary Examiner* — Igor Kershteyn
*Assistant Examiner* — Brian O Peters
(74) *Attorney, Agent, or Firm* — Brinks Gilson & Lione (57) ABSTRACT

A method of manufacturing a coated turbine vane (34) comprises manufacturing a turbine vane (34) having a platform (44) and an aerofoil (42) extending from the platform (44), a curved transition (60) connects the platform (44) to the aerofoil (42) and a recess (64) is provided in the curved transition (60) from the platform (44) to the aerofoil (42). A bond coating (70) is deposited on the platform (44), the aerofoil (42), the curved transition (60) and the recess (64). A ceramic thermal barrier coating (72) is deposited on the platform (44), the recess (64) and the curved transition (60) by plasma spraying. The recess (64) reduces the size of the step due to the ceramic thermal barrier coating (72) and hence improves the aerodynamics of the turbine vane (34).

20 Claims, 4 Drawing Sheets (51) Int. Cl.
 *C23C 28/00* (2006.01)
 *B22F 5/04* (2006.01)
 *C23C 4/11* (2016.01)
 *C23C 4/02* (2006.01)
 *B33Y 80/00* (2015.01)
 *B22F 3/105* (2006.01)

(52) U.S. Cl.
 CPC .. *F05D 2240/121* (2013.01); *F05D 2240/122* (2013.01); *F05D 2240/80* (2013.01); *F05D 2250/294* (2013.01); *F05D 2300/173* (2013.01); *F05D 2300/182* (2013.01); *F05D 2300/2118* (2013.01); *F05D 2300/611* (2013.01)

(56) References Cited

U.S. PATENT DOCUMENTS

| | | | | |
|---|---|---|---|---|
| 6,074,706 | A * | 6/2000 | Beverley | C23C 28/00 29/527.3 |
| 6,241,469 | B1 | 6/2001 | Beeck et al. | |
| 6,481,967 | B2 * | 11/2002 | Tomita | F01D 5/186 415/115 |
| 8,251,665 | B2 * | 8/2012 | Baldauf | F01D 11/008 416/193 A |
| 8,511,993 | B2 * | 8/2013 | Kemppainen | F01D 5/288 416/241 B |
| 10,502,230 | B2 * | 12/2019 | Anderson | F01D 5/34 |
| 2015/0322804 | A1 | 11/2015 | Butler et al. | |
| 2016/0362984 | A1 * | 12/2016 | Brandl | B23P 15/04 |

\* cited by examiner

FIG. 8

METHOD OF MANUFACTURING A COATED TURBINE BLADE AND A COATED TURBINE VANE

CROSS-REFERENCE TO RELATED APPLICATIONS

This application is based upon and claims the benefit of priority from British Patent Application Number 1703945.4 filed 13 Mar. 2017, the entire contents of which are incorporated by reference.

FIELD OF DISCLOSURE

The present disclosure relates to a method of manufacturing a coated turbine vane and a coated turbine vane.

BACKGROUND

A gas turbine engine comprises a turbine including one or more stages of turbine vanes and one or more stages of turbine blades. Each stage of turbine vanes comprises a plurality of circumferentially spaced turbine vanes and each stage of turbine blades comprises a plurality of circumferentially spaced turbine blades. The stages of turbine vanes and turbine blades are arranged alternately in flow series. The turbine vanes are mounted on static structures of the gas turbine engine whereas the turbine blades are mounted on rotatable structures of the gas turbine engine. A turbine vane generally comprises an aerofoil and two platforms and the aerofoil extends between and is secured to the platforms whereas a turbine blade generally comprises an aerofoil, a platform and a root and the aerofoil and root are secured to and extend in opposite directions from the platform.

The turbine vanes and turbine blades are located in a position downstream of a combustion chamber of the gas turbine engine and are exposed to gases at very high temperatures. In order to enable the turbine vanes and turbine blades to operate at these high temperatures the turbine vanes and turbine blades are manufactured from superalloys, are impingement and/or film cooled and are provided with thermal barrier coatings.

The platforms of the turbine vanes require a considerable amount of thermal protection whereas the aerofoils of the turbine vanes require a lesser amount of thermal protection. The thermal protection of the platforms of the turbine vanes comprises a metallic bond coating and a ceramic thermal barrier coating. The metallic bond coating is deposited onto the platforms by plasma spraying and the ceramic thermal barrier coating is deposited onto the metallic bond coating on the platforms by plasma spraying. The ceramic thermal barrier coating may have a thickness of up to 1 mm. Without these coatings on the platforms of the turbine vanes the platforms would be burnt away quickly resulting in a short service, operating, life for the turbine vanes. The aerofoils of the turbine vanes rely on film cooling to control the temperature of the aerofoil in conjunction with thermal protection. The thermal protection of the aerofoils of the turbine vanes also comprises a metallic bond coating and a ceramic thermal barrier coating. The metallic bond coating is deposited onto the aerofoils by plasma spraying and the ceramic thermal barrier coating is deposited onto the metallic bond coating on the aerofoils by physical vapour deposition (PVD), e.g. electron beam physical vapour deposition. The ceramic thermal barrier coating may have a thickness of up to 0.12 mm.

The turbine vanes have a fillet radius, a curved transition, from the aerofoil to the respective platform and the fillet radius is designed to optimise the aerodynamic performance of the turbine vanes.

However, the difference in the thickness of the ceramic thermal barrier coatings mentioned above on the platforms and the aerofoil of a turbine vane results in a step at the junction between each platform and the aerofoil rather than a smooth fillet radius, smooth curved transition, from the platform to the aerofoil. The step at each junction between the aerofoil and the platform of the turbine vane produces undesirable aerodynamic losses and thermodynamic characteristics. The aerodynamic losses from the steps at the junctions between the aerofoils and the platforms of the turbine vanes produce performance losses in the turbine and the gas turbine engine as a whole which results in increased fuel consumption.

The present disclosure seeks to provide a method of coating a turbine vane and a coated turbine vane which reduces or overcomes this problem.

SUMMARY

According to a first aspect of the present disclosure there is provided a method of manufacturing a coated turbine vane, the method comprising manufacturing a turbine vane, the turbine vane having a first platform and an aerofoil extending from the first platform, a first curved transition from the first platform to the aerofoil and a first recess in the first curved transition from the first platform to the aerofoil, depositing a bond coating on the first platform, the first curved transition from the first platform to the aerofoil of the turbine vane and the first recess in the first curved transition from the first platform to the aerofoil and depositing a ceramic thermal barrier coating on the first platform, the first curved transition from the first platform to the aerofoil of the turbine vane and the first recess in the first curved transition from the first platform to the aerofoil by plasma spraying.

The method may comprise casting the turbine vane with the first recess in the first curved transition from the first platform to the aerofoil.

The method may comprise casting the turbine vane and then machining the first recess in the first curved transition from the first platform to the aerofoil.

The method may comprise manufacturing the turbine vane by additive layer manufacturing with the first recess in the first curved transition from the first platform to the aerofoil.

The turbine vane may have a second platform, the aerofoil extending from the first platform to the second platform, a second curved transition from the second platform to the aerofoil and a second recess in the second curved transition from the second platform to the aerofoil, depositing a bond coating on the second platform, the second curved transition from the second platform to the aerofoil of the turbine vane and the second recess in the second curved transition from the second platform to the aerofoil and depositing a ceramic thermal barrier coating on the second platform, the second curved transition from the second platform to the aerofoil of the turbine vane and the second recess in the second curved transition from the second platform to the aerofoil by plasma spraying.

The method may comprise casting the turbine vane with the second recess in the second curved transition from the second platform to the aerofoil.

The method may comprise casting the turbine vane and then machining the second recess in the second curved transition from the second platform to the aerofoil.

The method may comprise manufacturing the turbine vane by additive layer manufacturing with the second recess in the second curved transition from the second platform to the aerofoil.

The machining may comprise grinding, milling, electro-discharge machining or electro-chemical machining.

The method may comprise placing a mask on the aerofoil of the turbine vane to prevent the plasma sprayed ceramic thermal barrier coating depositing onto the aerofoil.

The method may comprise depositing a bond coating on the aerofoil.

The method may comprise depositing a ceramic thermal barrier coating on the aerofoil from the first recess in the curved transition from the first platform to the aerofoil by physical vapour deposition.

The method may comprise depositing a ceramic thermal barrier coating on the aerofoil from the second recess in the second curved transition from the second platform to the aerofoil by physical vapour deposition.

The bond coating may comprise an overlay coating or an aluminide coating.

The overlay coating may comprise a MCrAlY coating where M is one or more of nickel, cobalt and iron, Cr is chromium, Al is aluminium and Y is one or more of yttrium, ytterbium and lanthanum.

The aluminide coating may comprise platinum aluminide, chromium aluminide, silicon aluminide, platinum chromium aluminide, platinum silicon aluminide, chromium silicon aluminide or platinum chromium silicon aluminide.

The bond coating may be deposited by plasma spraying or physical vapour deposition.

The aluminide coating may be deposited by pack alumi-nising, out of pack aluminising or slurry aluminising.

The ceramic thermal barrier coating may comprise yttria stabilised zirconia.

According to a second aspect of the present disclosure there is provided a coated turbine vane, the turbine vane having a first platform and an aerofoil extending from the first platform, a first curved transition from the first platform to the aerofoil and a first recess in the first curved transition from the first platform to the aerofoil, a bond coating on the first platform, the first curved transition from the first platform to the aerofoil of the turbine vane and the first recess in the first curved transition from the first platform to the aerofoil, and a ceramic thermal barrier coating on the first platform, the first curved transition from the first platform to the aerofoil of the turbine vane and the first recess in the first curved transition from the first platform to the aerofoil.

The coated turbine vane may have a second platform, the aerofoil extending from the first platform to the second platform, a second curved transition from the second platform to the aerofoil and a second recess in the second curved transition from the second platform to the aerofoil, a bond coating on the second platform, the second curved transition from the second platform to the aerofoil of the turbine vane and the second recess in the second curved transition from the second platform to the aerofoil and a ceramic thermal barrier coating on the second platform, the second curved transition from the second platform to the aerofoil of the turbine vane and the second recess in the second curved transition from the second platform to the aerofoil.

The bond coating may be on the aerofoil.

The bond coating may comprise an overlay coating or an aluminide coating.

The overlay coating may comprise a MCrAlY coating where M is one or more of nickel, cobalt and iron, Cr is chromium, Al is aluminium and Y is one or more of yttrium, ytterbium and lanthanum.

The aluminide coating may comprise platinum aluminide, chromium aluminide, silicon aluminide, platinum chromium aluminide, platinum silicon aluminide, chromium silicon aluminide or platinum chromium silicon aluminide.

The ceramic thermal barrier coating may comprise yttria stabilised zirconia. The ceramic thermal barrier coating may comprise zirconia stabilised with ceria, ytterbia or india. The ceramic thermal barrier coating may comprise zirconia stabilised with yttria and erbia. The ceramic thermal barrier coating may comprise zirconia stabilised with yttria, erbia and gadolinia. The ceramic thermal barrier coating may comprise zirconia stabilised with yttria and gadolinia.

A method of manufacturing a coated turbine vane comprises manufacturing a turbine vane having a platform and an aerofoil extending from the platform, a curved transition connects the platform to the aerofoil and a recess is provided in the curved transition from the platform to the aerofoil, depositing a bond coating on the platform, the aerofoil, the curved transition and the recess, and depositing a ceramic thermal barrier coating on the platform, the recess and the curved transition by plasma spraying.

The skilled person will appreciate that except where mutually exclusive, a feature described in relation to any one of the above aspects of the invention may be applied mutatis mutandis to any other aspect of the invention.

BRIEF DESCRIPTION OF DRAWINGS

Embodiments of the disclosure will now be described by way of example only, with reference to the Figures, in which.

DETAILED DESCRIPTION

Figure 1:
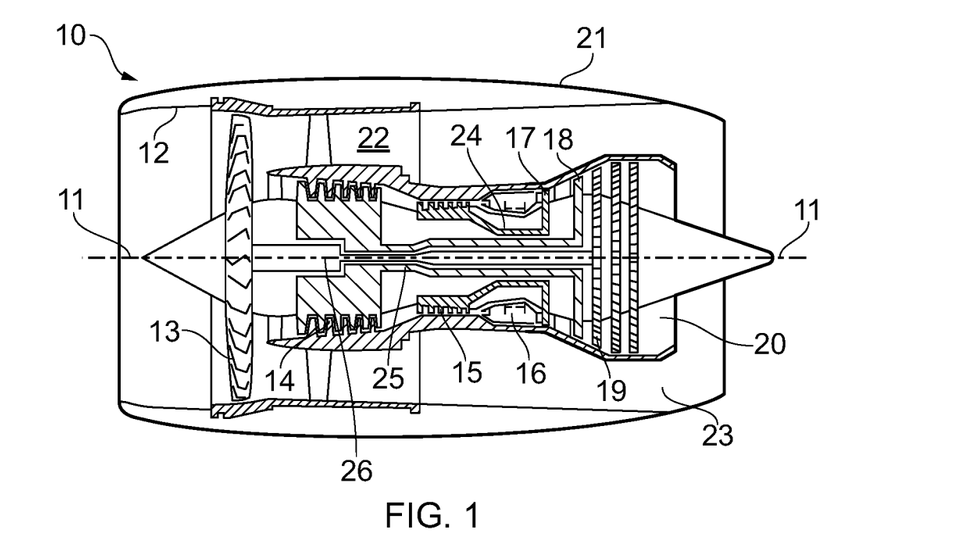
FIG. 1 is a part sectional side view of a geared turbofan gas turbine engine according to the present disclosure.

With reference to FIG. 1, a turbofan gas turbine engine is generally indicated at 10, having a principal and rotational axis 11. The engine 10 comprises, in axial flow series, an air intake 12, a propulsive fan 13, an intermediate-pressure, or booster, compressor 14, a high-pressure compressor 15, combustion equipment 16, a high-pressure turbine 17, an intermediate-pressure turbine 18, a low-pressure turbine 19 and a core exhaust nozzle 20. The intermediate-pressure compressor 14, the high-pressure compressor 15, the combustion equipment 16, the high-pressure turbine 17, the intermediate-pressure turbine 18 and the low-pressure turbine 19 form a core engine 11. A nacelle 21 generally surrounds the engine 10 and defines the intake 12, a bypass duct 22 and a bypass exhaust nozzle 23.

The gas turbine engine 10 works in the conventional manner so that air entering the intake 12 is compressed by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high, the intermediate and the low-pressure turbines 17, 18 and 19 respectively before being exhausted through the core nozzle 20 to provide additional propulsive thrust. The high-pressure turbine 17 drives the high-pressure compressor 15 by a shaft 24. The intermediate-pressure turbine 18 drives the intermediate-pressure compressor 14 directly via a shaft 25 and the low-pressure turbine 19 drives the fan 13 via a shaft 26.

Figure 2:
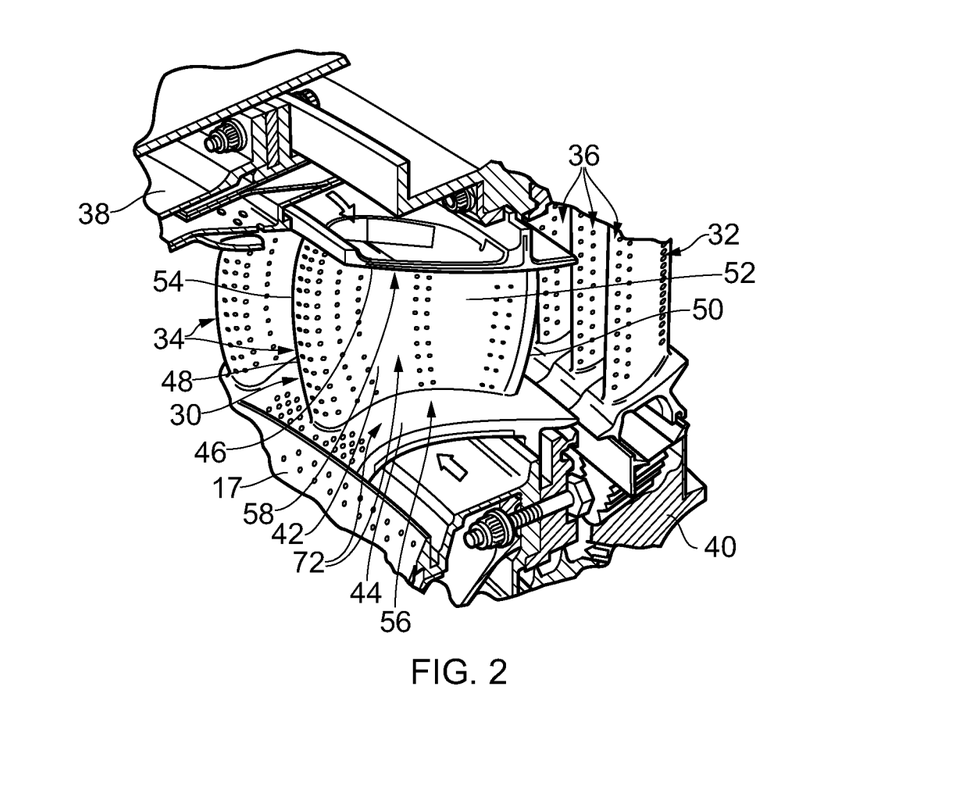
FIG. 2 is an enlarged part sectional side view of a portion of the turbine of the turbofan gas turbine engine shown in FIG. 1.

The high pressure turbine 17, as shown more clearly in FIG. 2, comprises a stage of combustion chamber outlet guide vanes, alternatively known as a stage of high pressure turbine inlet guide vanes, 30 and a stage of high pressure turbine blades 32. The stage of high pressure turbine inlet guide vanes, or in short the stage of turbine vanes 30 comprises a plurality of circumferentially spaced turbine vanes 34 and the stage of turbine blades 32 comprises a plurality of circumferentially spaced turbine blades 36. The stage of turbine vanes 30 and the stage of turbine blades 32 are arranged alternately in flow series, in this example in axial flow series. The turbine vanes 34 are mounted on a static structure, a turbine casing, 38 of the gas turbine engine 10 whereas the turbine blades 36 are mounted on a turbine rotor, a turbine disc 40.

Each turbine vane 34 generally comprises an aerofoil 42 and two platforms 44 and 46 and the aerofoil 42 extends between and is secured to the platforms 44 and 46. In this example the platforms are a radially inner platform 44 and a radially outer platform 46 and the aerofoil 42 extends radially between and is secured to the radially inner platform 44 and the radially outer platform 46. The aerofoil 42 of each turbine vane 34 comprises a leading edge 48, a trailing edge 50, a concave surface 52 which extends from the leading edge 48 to the trailing edge 50 and a convex surface 54 which extends from the leading edge 48 to the trailing edge 50. The radially inner platform 44 has a radially outer surface 56 and the radially outer platform 46 has a radially inner surface 58. Each turbine vane 34 may be separate from all the other turbine vanes 34. Alternatively, and as shown in this example, two or more vanes 34 may be an integral, monolithic, unitary or single piece in which the aerofoil 34 of each of these turbine vanes 30 extends between two common platforms 44 and 46, for example between a common radially inner platform 44 and a common radially outer platform 46. There is a first curved transition, or fillet radius, 60 at the junction of the radially inner platform 44 to the aerofoil 42 and a second curved transition, or fillet radius, 62 at the junction of the radially outer platform 46 to the aerofoil 42. A first recess 64 is provided in the first curved transition 60 from the radially inner platform 44 to the aerofoil 42 and a second recess 66 is provided in the second curved transition 62 from the radially outer platform 46 to the aerofoil 42. The turbine vanes 34 in FIG. 2 are provided with a coating 72 to provide thermal protection.

Figures 3, 3A:
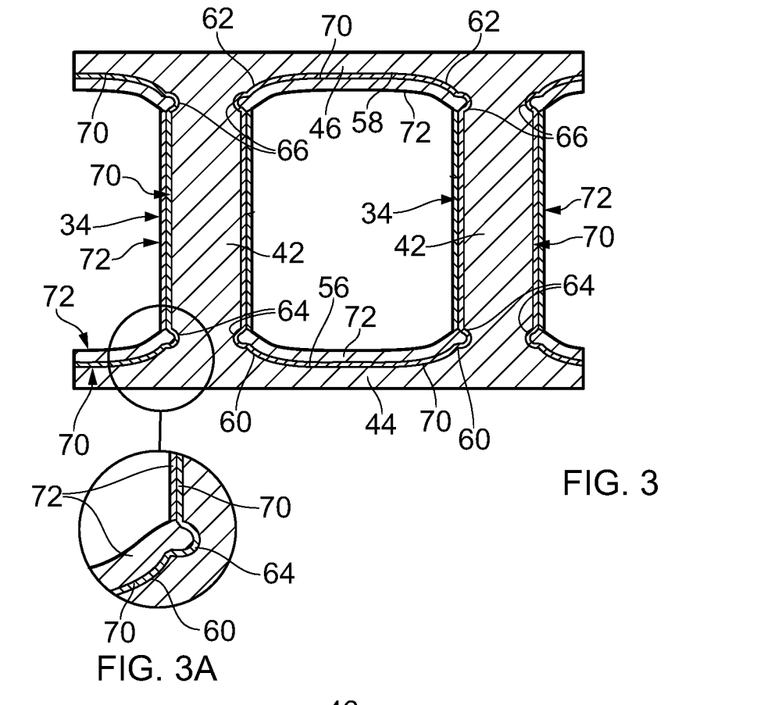
FIG. 3 is an enlarged cross-sectional view though a coated turbine vane shown in FIG. 2.
FIG. 3A is a further enlarged portion of FIG. 3.
Figure 4:
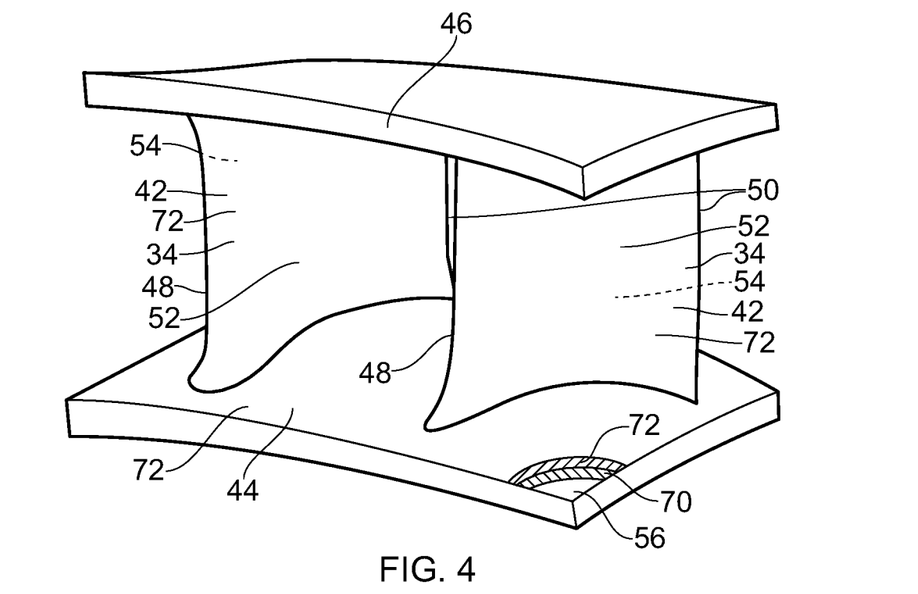
FIG. 4 is a perspective view of the coated turbine vane shown in FIG. 3.

A coated turbine vane 34 is shown more clearly in FIGS. 3, 3A and 4. The coated turbine vane 34 has a bond coating 70 on the radially outer surface 56 of the radially inner platform 44, on the leading edge 48 of the aerofoil 42, on the concave surface 52 of the aerofoil 42, on the convex surface 54 of the aerofoil 42 and on the radially inner surface 58 of the radially outer platform 46. The bond coating 70 is also on the surfaces of the first curved transition 60, the first recess 64, the second curved transition 62 and the second recess 66. Furthermore, a ceramic thermal barrier coating 72 is provided on top of the bond coating 70 on the radially outer surface 56 of the radially inner platform 44, on the leading edge 48 of the aerofoil 42, on the concave surface 52 of the aerofoil 42, on the convex surface 54 of the aerofoil 42 and on the radially inner surface 58 of the radially outer platform 46. The ceramic thermal barrier coating 72 is also on top of the bond coating 70 on the surfaces of the first curved transition 60, the first recess 64, the second curved transition 62 and the second recess 66.

The bond coating 70 comprises an overlay coating, an aluminide coating, an overlay coating on top of an aluminide coating or an aluminide coating on top of an overlay coating. The overlay coating may comprise a MCrAlY coating where M is one or more of nickel, cobalt and iron, Cr is chromium, Al is aluminium and Y is one or more of yttrium, ytterbium and lanthanum. The aluminide coating may comprise platinum aluminide, chromium aluminide, silicon aluminide, platinum chromium aluminide, platinum silicon aluminide, chromium silicon aluminide or platinum chromium silicon aluminide. The ceramic thermal barrier coating 72 may comprise yttria stabilised zirconia or zirconia stabilised with other suitable metal oxides, e.g. ceria, ytterbia, india etc. Alternatively, the ceramic thermal barrier coating 70 may comprise zirconia stabilised with yttria and erbia, zirconia stabilised with yttria, erbia and gadolinia or zirconia stabilised with yttria and gadolinia.

The ceramic thermal barrier coating 72 has a greater thickness on the radially outer surface 56 of the radially inner platform 44 and on the radially inner surface 58 of the radially outer platform 46 than on the leading edge 48 of the aerofoil 42, on the concave surface 52 of the aerofoil 42, on the convex surface 54 of the aerofoil 42 in order to provide greater thermal protection to the radially inner platform 44 and the radially outer platform 46 than to the aerofoil 42.

A problem, as mentioned previously, with providing a thicker ceramic thermal barrier coating 72 on the radially outer surface 56 of the radially inner platform 44 and on the radially inner surface 58 of the radially outer platform 46 than on the leading edge 48 of the aerofoil 42, on the concave surface 52 of the aerofoil 42, on the convex surface 54 of the aerofoil 42 is that it results in steps in the surface of the ceramic thermal barrier coating 72 at the two curved transitions from the aerofoil 42 to the radially inner platform 44 and the radially outer platform 46, e.g. at the junctions between the aerofoil 42 and radially inner platform 44 and the radially outer platform 46. However, in the present disclosure the thicker ceramic thermal barrier coating 72 deposited on the radially inner platform 44 and the radially outer platform 46 is also deposited into the first recess 64 and the second recess 66 and eliminates the steps or reduces or minimises the heights of the steps in the ceramic thermal barrier coating 72 at the first and second curved transitions 60 and 62 from the aerofoil 42 to the radially inner platform 44 and the radially outer platform 46, e.g. at the junctions between the aerofoil 42 and radially inner platform 44 and the radially outer platform 46. The reduction in the height of the steps reduces the aerodynamic losses and reduces the undesirable thermodynamic characteristics. The reduction in the aerodynamic losses from the steps at the junctions between the aerofoils and the platforms of the turbine vanes reduces the performance losses in the turbine and the gas turbine engine as a whole which results in decreased fuel consumption.

Figures 5, 5A:
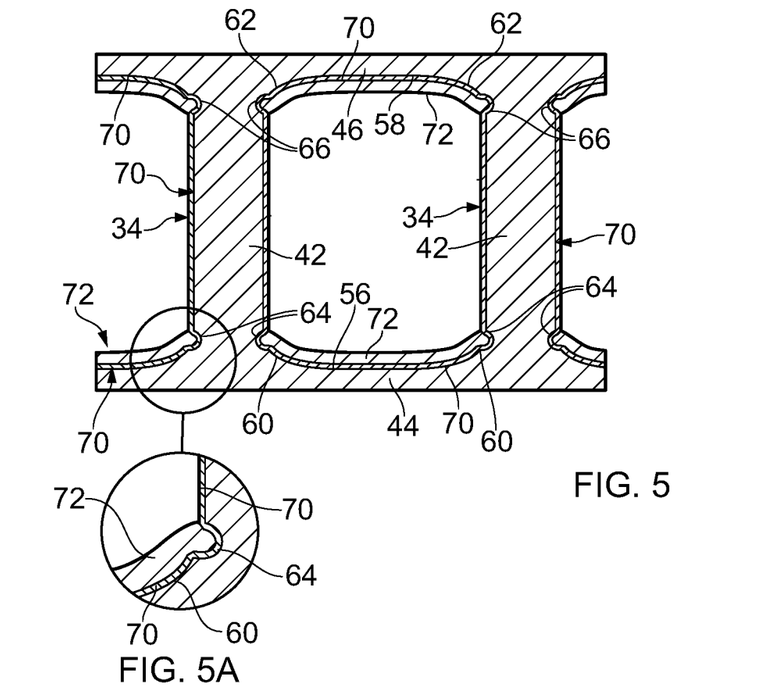
FIG. 5 is an enlarged cross-sectional view though an alternative coated turbine vane shown in FIG. 2.
FIG. 5A is a further enlarged portion of FIG. 5.
Figure 6:
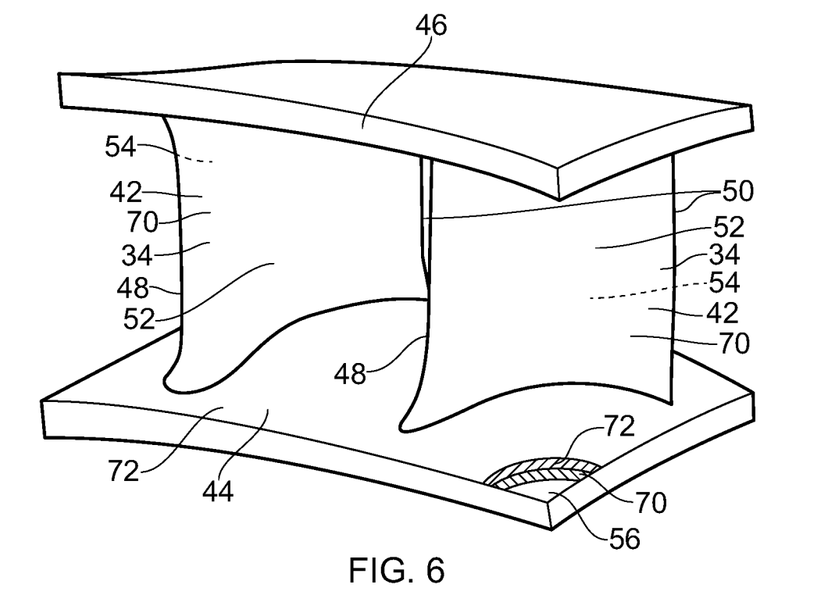
FIG. 6 is a perspective view of the coated turbine vane shown in FIGS. 6 and 5.

A further coated turbine vane 134 is shown more clearly in FIGS. 5, 5A and 6. The coated turbine vane 134 is similar to that shown and described with reference to 3 to 5 and like parts are denoted by like numerals. The coated turbine vane 134 has a bond coating 70 on the radially outer surface 56 of the radially inner platform 44 and on the radially inner surface 58 of the radially outer platform 46. The bond coating 70 is also on the surfaces of the first curved transition 60, the first recess 64, the second curved transition 62 and the second recess 66. Furthermore, a ceramic thermal barrier coating 72 is provided on top of the bond coating 70 on the radially outer surface 56 of the radially inner platform 44 and on the radially inner surface 58 of the radially outer platform 46. The ceramic thermal barrier coating 72 is also on top of the bond coating 70 on the surfaces of the first curved transition 60, the first recess 64, the second curved transition 62 and the second recess 66. The bond coating 70 is provided on the aerofoil 42 for environmental protection, e.g. to provide oxidation and corrosion protection. The bond coating 70 and the ceramic thermal barrier coating 72 are the same as those described with reference to FIGS. 3 to 5.

The ceramic thermal barrier coating 72 is only provided on the radially outer surface 56 of the radially inner platform 44 and on the radially inner surface 58 of the radially outer platform 46 in order to provide greater thermal protection to the radially inner platform 44 and the radially outer platform 46 than to the aerofoil 42.

A problem with providing a ceramic thermal barrier coating 72 on the radially outer surface 56 of the radially inner platform 44 and on the radially inner surface 58 of the radially outer platform 46 and no ceramic thermal barrier coating 72 on the aerofoil 42 is that it results in steps due to the ceramic thermal barrier coating 72 at the two curved transitions from the aerofoil 42 to the radially inner platform 44 and the radially outer platform 46, e.g. at the junctions between the aerofoil 42 and radially inner platform 44 and the radially outer platform 46. However, in the present disclosure ceramic thermal barrier coating 72 deposited on the radially inner platform 44 and the radially outer platform 46 is also deposited into the first recess 64 and the second recess 66 and eliminates the steps or reduces or minimises the heights of the steps in the ceramic thermal barrier coating 72 at the first and second curved transitions 60 and 62 from the aerofoil 42 to the radially inner platform 44 and the radially outer platform 46, e.g. at the junctions between the aerofoil 42 and radially inner platform 44 and the radially outer platform 46. The reduction in the height of the steps reduces the aerodynamic losses and reduces the undesirable thermodynamic characteristics. The reduction in the aerodynamic losses from the steps at the junctions between the aerofoils and the platforms of the turbine vanes reduces the performance losses in the turbine and the gas turbine engine as a whole which results in decreased fuel consumption.

Figures 7, 7A:
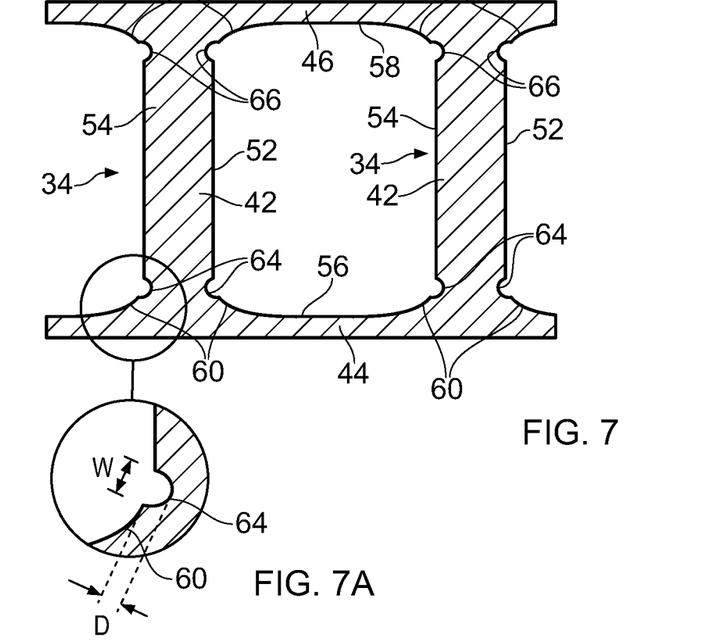
FIG. 7 is an enlarged cross-sectional view through a turbine vane shown in FIG. 3 and FIG. 5 before deposition of the coatings.
FIG. 7A is a further enlarged portion of FIG. 7.
Figure 8:
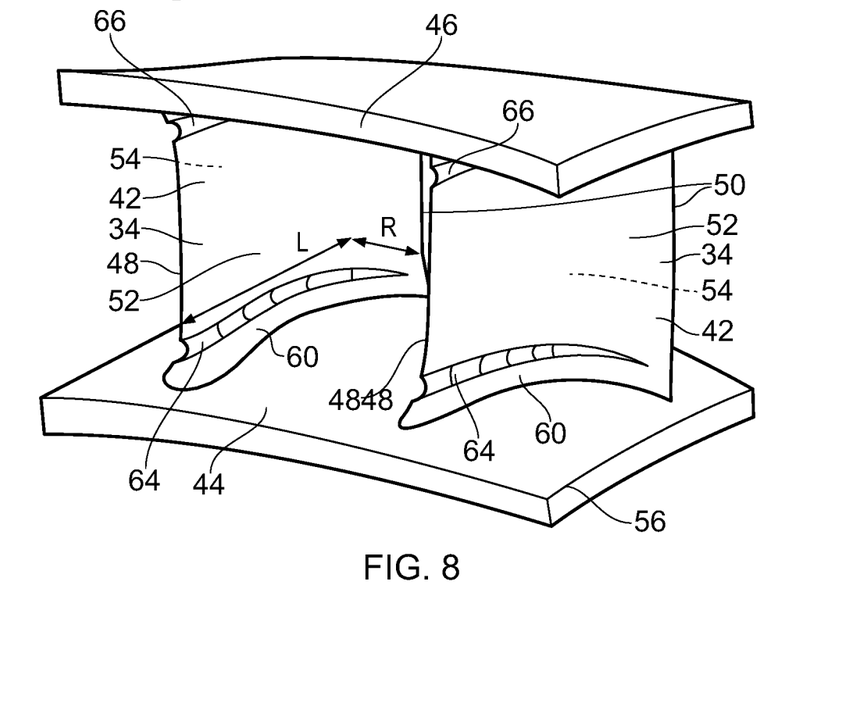
FIG. 8 is a perspective view of the turbine vane shown in FIG. 7.

FIGS. 7, 7A and 8 show the turbine vane 34, 134 before a coating has been deposited onto the turbine vane 34, 134. A method of manufacturing a coated turbine vane 34, 134 firstly comprises manufacturing the turbine vane 34, 134. The turbine vane 34, 134 comprises an aerofoil 42 and two platforms 44 and 46 and the aerofoil 42 extends between and is secured to the platforms 44 and 46. In this example the platforms are a radially inner platform 44 and a radially outer platform 46 and the aerofoil 42 extends radially between and is secured to the radially inner platform 44 and the radially outer platform 46. The aerofoil 42 of the turbine vane 34 comprises a leading edge 48, a trailing edge 50, a concave surface 52 which extends from the leading edge 48 to the trailing edge 50 and a convex surface 54 which extends from the leading edge 48 to the trailing edge 50. The radially inner platform 44 has a radially outer surface 56 and the radially outer platform 46 has a radially inner surface 58. As mentioned previously the turbine vane 34 may be separate from all the other turbine vanes 34. Alternatively, and as shown in this example, two or more turbine vanes 34 may be an integral, monolithic, unitary or single piece in which the aerofoil 34 of each of these turbine vanes 30 extends between two common platforms 44 and 46, for example between a common radially inner platform 44 and a common radially outer platform 46. There is a first curved transition, or fillet radius, 60 from the radially inner platform 44 to the aerofoil 42 and a second curved transition, or fillet radius, 62 from the radially outer platform 46 to the aerofoil 42. A first recess 64 is provided in the first curved transition 60 from the radially inner platform 44 to the aerofoil 42 and a second recess 66 is provided in the second curved transition 62 from the radially outer platform 46 to the aerofoil 42.

The turbine vane 34, 134 may be manufactured by casting, e.g. by lost wax casting including conventional casting, directional solidification casting or single crystal casting, to produce the turbine vane 34, 134 with the first recess 64 in the first curved transition 60 from the radially inner platform 44 to the aerofoil 42 and with the second recess 66 in the second curved transition 62 from the radially outer platform 46 to the aerofoil 42.

Alternatively, the turbine vane 34, 134 may be manufactured by casting, e.g. by lost wax casting including conventional casting, directional solidification casting or single crystal casting, to produce the turbine vane 34, 134 and then machining the first recess 64 in the first curved transition 60 from the radially inner platform 44 to the aerofoil 42 and machining the second recess 66 in the second curved transition 62 from the radially outer platform 46 to the aerofoil 42. The machining of the first and second recesses 64 and 66 may comprise grinding, milling, electro-discharge machining or electro-chemical machining.

Additionally, the turbine vane 34, 134 may be manufactured by additive layer manufacturing with the first recess 64 in the first curved transition 60 from the radially inner platform 44 to the aerofoil 42 and with the second recess 66 in the second curved transition 64 from the radially outer platform 44 to the aerofoil 42.

The method of manufacturing the coated turbine vane 34, 134 secondly comprises depositing a bond coating 70 on the radially inner platform 44, the first curved transition 60 from the radially inner platform 44 to the aerofoil 42 of the turbine vane 34 and the first recess 64 in the first curved transition 60 from the radially inner platform 44 to the aerofoil 42 and depositing the bond coating 70 on the radially outer platform 46, the second curved transition 62 from the radially outer platform 46 to the aerofoil 42 of the turbine vane 34, 134 and the second recess 66 in the second curved transition 62 from the radially outer platform 46 to the aerofoil 42.

In the case of the turbine vane 34 the bond coating 70 is also deposited on the aerofoil 42. In the case of the turbine vane 134 the bond coating 70 may be deposited onto the aerofoil 42 as an environmental protection coating, e.g. to provide oxidation and corrosion protection. In the case of the turbine vane 34 and the turbine vane 134 the bond coating 70 beneath the thermal barrier coating 72 also provides oxidation and corrosion protection especially if the thermal barrier coating 72 is damaged.

The overlay, e.g. MCrAlY, bond coating 70 may be deposited by plasma spraying or physical vapour deposition. The aluminide coating may be deposited by pack aluminising, out of pack aluminising or slurry aluminising.

The method of manufacturing the coated turbine vane 34, 134 thirdly comprises depositing a ceramic thermal barrier coating 72 on the radially inner platform 44, the first recess 64 in the first curved transition 60 from the radially inner platform 44 to the aerofoil 42 and the first curved transition 60 from the radially inner platform 44 to the aerofoil 42 of the turbine vane 34, 134 to the first recess 64 in the first curved transition 60 from the radially inner platform 44 to the aerofoil 42 and on the radially outer platform 46, the second recess 66 in the second curved transition 62 from the radially outer platform 46 to the aerofoil 42 and the second curved transition 62 from the radially outer platform 46 to the aerofoil 42 of the turbine vane 234, 134 to the second recess 66 in the second curved transition 62 from the radially outer platform 44 to the aerofoil 42 by plasma spraying, thermal spraying etc. The thermal barrier coating 72 is deposited to a thickness of up to 1 mm.

The method comprises placing a mask on the aerofoil 42 of the turbine vane 34, 134 after deposition of the bond coating 70 to prevent the plasma sprayed ceramic thermal barrier coating 72 depositing onto the aerofoil 42. The mask is located on the aerofoil 42 such that a first edge of the mask is adjacent, or slightly overhanging, the first recess 64 and a second edge of the mask is adjacent, or slightly overhanging, the second recess 66.

The method comprises depositing the ceramic thermal barrier coating 72 on the aerofoil 42 of the turbine vane 34 from the first recess 64 in the first curved transition 60 from the radially inner platform 44 to the aerofoil 42 and depositing the ceramic thermal barrier coating 72 on the aerofoil 42 from the second recess 66 in the second curved transition 62 from the radially outer platform 46 to the aerofoil 42 by physical vapour deposition. The ceramic thermal barrier coating 72 is deposited to a thickness of up to 0.12 mm. The ceramic thermal barrier coating 72 comprises a plurality of columnar grains which extend substantially perpendicularly from the respective surface of the aerofoil 42. The columnar grains of the ceramic thermal barrier coating 72 grow from a layer of alumina which is formed on the bond coating 70.

The turbine vane 134 does not have a ceramic thermal barrier coating on the aerofoil 42. It may also be possible, in some circumstances, to provide a turbine vane 134 without the bond coating on the aerofoil 42.

FIGS. 7, 7A and 8 shows more details of the first and second recesses 64 and 66. The first recess 64 is arranged at the junction between the aerofoil 42 and the first curved transition 60 from the radially inner platform 44 to the aerofoil 42. The second recess 66 is arranged at the junction between the aerofoil 42 and the second curved transition 62 from the radially outer platform 46 to the aerofoil 42. The first recess 64 extends from the leading edge 48 of the aerofoil 42 towards the trailing edge 50 on the convex surface 54 of the aerofoil 42, around the leading edge 48 of the aerofoil 42 and from the leading edge 48 of the towards the trailing edge 50 on the concave surface 52 of the aerofoil 42. The second recess 66 also extends from the leading edge 48 of the aerofoil 42 towards the trailing edge 50 on the convex surface 54 of the aerofoil 42, around the leading edge 48 of the aerofoil 42 and from the leading edge 48 of the aerofoil 42 towards the trailing edge 50 on the concave surface 52 of the aerofoil 42. The first recess 64 is a groove and the second recess 66 is a groove. The first recess, or groove, 64 is arcuate in cross-section and the second recess, or groove, 66 is arcuate in cross-section and the first recess 64 and/or the second recess 66 may be part circular in cross-section.

A shown in FIG. 7A the first recess 64 has a depth D and a width W. The first recess 64 and the second recess 66 each have a depth between and including 0.2 and 0.8 mm. In one example the first recess 64 and the second recess 66 each have a depth of 0.5 mm. The first recess 64 and the second recess 66 each have a width between and including 1.5 to 3 mm. In one example the first recess 64 and the second recess 66 each have a width of 2 mm.

The first recess 64 is spaced from the trailing edge 50 of the aerofoil 42 and the second recess 66 is spaced from the trailing edge 50 of the aerofoil 42, as shown in FIG. 8. The first recess 64 has a constant width W and a constant depth D on the concave surface 52 and the convex surface 54 over length L, which is between and including 75% and 80% of the chord length of the aerofoil 42 from the leading edge 48. The first recess 64 progressively decreases in width and depth on the concave surface 52 and the convex surface 54 for a length l between and including 25% and 20% of the chord length of the aerofoil 42. Similarly, the second recess 66 has a constant width and a constant depth on the concave surface 52 and the convex surface 54 between and including 75% to 80% of the chord length of the aerofoil 42 from the leading edge 48. The second recess 66 progressively decreases in width and depth on the concave surface 52 and the convex surface 54 between and including 25% to 20% of the chord length of the aerofoil 42.

The ratio of the width W to depth D of the first recess 64 may be between and includes 2 to 1 to 8 to 1. The ratio of the width W to depth D of the first recess 64 may be between and include 3 to 1 to 5 to 1. The ratio of the width W to depth D of the first recess 64 is preferably 4 to 1. The ratio of the width W to depth D of the second recess 66 may be between and include 2 to 1 to 8 to 1. The ratio of the width W to depth D of the second recess 66 may be between and include 3 to 1 to 5 to 1. The ratio of the width W to depth D of the second recess 66 is preferably 4 to 1.

Alternatively, the first recess 64 extends to, and around, the trailing edge 50 of the aerofoil 42 and the second recess 66 extends to, and around, the trailing edge 50 of the aerofoil 42 to produce an undercut at the trailing edge 50 of the aerofoil 42. The bond coating 70 and the ceramic thermal barrier coating 72 are deposited into the first recess 64 and the second recess 66 at the trailing edge 50 of the aerofoil. This reduces, or removes, the step due to the ceramic thermal barrier 72 at the point of the aerofoil 42 where the aerodynamics is most significantly affected.

The bond coating on the platform or platforms may be the same as or different to the bond coating on the aerofoil. For example the bond coating on the platform or platforms may be an overlay coating and the bond coating on the aerofoil may be an aluminide coating. The bond coating on the platform or platforms may be different aluminide coatings or different overlay coatings. For example the bond coating on the platform or platforms may be a platinum aluminide coating and the bond coating on the aerofoil may be an aluminide coating.

Although the present disclosure has been described with reference to a turbine vane having a radially inner platform, a radially outer platform and an aerofoil extending radially between the radially inner platform and the radially outer platform it is equally applicable to a turbine vane having an axially upstream platform, an axially downstream platform and an aerofoil extending axially between the axially upstream platform and the axially downstream platform or simply to a turbine vane having a first platform, a second platform and an aerofoil extending between the first platform and the second platform.

Although the present disclosure has referred to turbine vane having a first platform, a second platform and an aerofoil extending between the first platform and the second platform it is equally applicable to a turbine vane simply comprising a platform and an aerofoil extending from the platform, e.g. a radially inner platform and an aerofoil extending radially from the radially inner platform, a radially outer platform and an aerofoil extending radially from the radially outer platform, an axially upstream platform and an aerofoil extending axially from the axially upstream platform or an axially downstream platform and an aerofoil extending axially from the axially downstream platform.

The advantage of the present disclosure is that it eliminates the steps or reduces or minimises the heights of the steps in the ceramic thermal barrier coating at the first and second curved transitions from the aerofoil to the radially inner platform and the radially outer platform e.g. at the junctions between the aerofoil and the radially inner platform and the radially outer platform. The reduction in the height of the steps reduces the aerodynamic losses and reduces the undesirable thermodynamic characteristics. The reduction in the aerodynamic losses from the steps at the junctions between the aerofoils and the platforms of the turbine vanes reduces the performance losses in the turbine and the gas turbine engine as a whole which results in decreased fuel consumption. The recesses also enable more accurate positioning of the mask on the aerofoil, more accurate deposition of the associated thermal barrier coating on the platforms and aerofoil and hence a reduction in scrapping, or re-working, of turbine vanes due to inaccurate positioning of the thermal barrier coatings.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing a coated turbine vane, the method comprising manufacturing a turbine vane, the turbine vane having a first platform and an aerofoil extending from the first platform, a first curved transition from the first platform to the aerofoil and a first recess in the first curved transition from the first platform to the aerofoil,
depositing a bond coating on the first platform, the first curved transition from the first platform to the aerofoil of the turbine vane and the first recess in the first curved transition from the first platform to the aerofoil and
depositing a ceramic thermal barrier coating on the first platform, the first curved transition from the first plat-
form to the aerofoil of the turbine vane and the first recess in the first curved transition from the first platform to the aerofoil by plasma spraying.

2. A method as claimed in claim 1 comprising casting the turbine vane with the first recess in the first curved transition from the first platform to the aerofoil.

3. A method as claimed in claim 1 comprising casting the turbine vane and then machining the first recess in the first curved transition from the first platform to the aerofoil.

4. A method as claimed in claim 3 wherein the machining comprising grinding, milling, electro-discharge machining or electro-chemical machining.

5. A method as claimed in claim 1 comprising manufacturing the turbine vane by additive layer manufacturing with the first recess in the first curved transition from the first platform to the aerofoil.

6. A method as claimed in claim 1 wherein the turbine vane having a second platform, the aerofoil extending from the first platform to the second platform, a second curved transition from the second platform to the aerofoil and a second recess in the second curved transition from the second platform to the aerofoil,
the method comprising depositing a bond coating on the second platform, the second curved transition from the second platform to the aerofoil of the turbine vane and the second recess in the second curved transition from the second platform to the aerofoil and
depositing a ceramic thermal barrier coating on the second platform, the second curved transition from the second platform to the aerofoil of the turbine vane and the second recess in the second curved transition from the second platform to the aerofoil by plasma spraying.

7. A method as claimed in claim 6 comprising casting the turbine vane with the first recess in the first curved transition from the first platform to the aerofoil and the second recess in the second curved transition from the second platform to the aerofoil.

8. A method as claimed in claim 6 comprising casting the turbine vane and then machining the first recess in the first curved transition from the first platform to the aerofoil and machining the second recess in the second curved transition from the second platform to the aerofoil.

9. A method as claimed in claim 6 comprising manufacturing the turbine vane by additive layer manufacturing with the first recess in the first curved transition from the first platform to the aerofoil and the second recess in the second curved transition from the second platform to the aerofoil.

10. A method as claimed in claim 6 comprising depositing a ceramic thermal barrier coating on the aerofoil from the first recess in the curved transition from the first platform to the aerofoil and on the aerofoil from the second recess in the second curved transition from the second platform to the aerofoil by physical vapour deposition.

11. A method as claimed in claim 1 comprising placing a mask on the aerofoil of the turbine vane to prevent the plasma sprayed ceramic thermal barrier coating depositing onto the aerofoil.

12. A method as claimed in claim 1 comprising depositing a ceramic thermal barrier coating on the aerofoil from the first recess in the curved transition from the first platform to the aerofoil by physical vapour deposition.

13. A method as claimed in claim 1 wherein the bond coating is selected from the group consisting of an overlay coating and an aluminide coating.

14. A method as claimed in claim 13 wherein the overlay coating comprises a MCrAlY coating where M is one or more of nickel, cobalt and iron, Cr is chromium, Al is aluminium and Y is one or more of yttrium, ytterbium and lanthanum.

15. A method as claimed in claim 14 comprising depositing the bond coating by a method selected from the group consisting of plasma spraying and physical vapour deposition.

16. A method as claimed in claim 13 wherein the aluminide coating is selected from the group consisting of platinum aluminide, chromium aluminide, silicon aluminide, platinum chromium aluminide, platinum silicon aluminide, chromium silicon aluminide and platinum chromium silicon aluminide.

17. A method as claimed in claim 16 comprising depositing the aluminide coating by a method selected from the group consisting of pack aluminising, out of pack aluminising and slurry aluminising.

18. A method as claimed in claim 1 wherein the ceramic thermal barrier coating comprises yttria stabilised zirconia.

19. A coated turbine vane, the turbine vane having a first platform and an aerofoil extending from the first platform, a first curved transition from the first platform to the aerofoil and a first recess in the first curved transition from the first platform to the aerofoil,
   a bond coating on the first platform, the first curved transition from the first platform to the aerofoil of the turbine vane and the first recess in the first curved transition from the first platform to the aerofoil, and
   a ceramic thermal barrier coating on the first platform, the first curved transition from the first platform to the aerofoil of the turbine vane and the first recess in the first curved transition from the first platform to the aerofoil.

20. A coated turbine vane as claimed in claim 19 wherein the turbine vane having a second platform, the aerofoil extending from the first platform to the second platform, a second curved transition from the second platform to the aerofoil and a second recess in the second curved transition from the second platform to the aerofoil,
   a bond coating on the second platform, the second curved transition from the second platform to the aerofoil of the turbine vane and the second recess in the second curved transition from the second platform to the aerofoil and
   a ceramic thermal barrier coating on the second platform, the second curved transition from the second platform to the aerofoil of the turbine vane and the second recess in the second curved transition from the second platform to the aerofoil.

* * * * *